United States Patent
Kim et al.

(10) Patent No.: US 10,757,618 B2
(45) Date of Patent: Aug. 25, 2020

(54) METHOD AND APPARATUS FOR PERFORMING HANDOVER

(71) Applicant: LG ELECTRONICS INC., Seoul (KR)

(72) Inventors: Hongsuk Kim, Seoul (KR); Jaewook Lee, Seoul (KR); Sangwon Kim, Seoul (KR); Youngdae Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/262,241

(22) Filed: Jan. 30, 2019

(65) Prior Publication Data

US 2019/0246323 A1  Aug. 8, 2019

Related U.S. Application Data

(60) Provisional application No. 62/627,208, filed on Feb. 7, 2018.

(51) Int. Cl.
*H04W 36/04* (2009.01)
*H04W 36/00* (2009.01)
*H04W 36/30* (2009.01)

(52) U.S. Cl.
CPC ....... *H04W 36/04* (2013.01); *H04W 36/0058* (2018.08); *H04W 36/0061* (2013.01); *H04W 36/0077* (2013.01); *H04W 36/0079* (2018.08); *H04W 36/0085* (2018.08); *H04W 36/00835* (2018.08); *H04W 36/305* (2018.08)

(58) Field of Classification Search
None
See application file for complete search history.

(56) References Cited

U.S. PATENT DOCUMENTS

| | | | | |
|---|---|---|---|---|
| 2012/0196602 A1* | 8/2012 | Grob-Lipski | ......... | H04W 28/26 455/436 |
| 2015/0373599 A1* | 12/2015 | Kim | ...................... | H04W 36/32 370/331 |
| 2016/0014839 A1* | 1/2016 | Liu | ...................... | H04W 76/27 370/329 |
| 2016/0366622 A1* | 12/2016 | Yang | ...................... | H04L 47/24 |
| 2018/0227805 A1* | 8/2018 | Jang | .................. | H04W 28/0268 |

* cited by examiner

*Primary Examiner* — Charles N Appiah
*Assistant Examiner* — Frank E Donado
(74) *Attorney, Agent, or Firm* — Dentons US LLP

(57) ABSTRACT

Provided are a method for performing a handover by a user equipment (UE) in a wireless communication system, and an apparatus supporting the same. The method may include: receiving information on candidate target cells for the handover and a handover condition, from a base station; initiating a handover to a first target cell among the candidate target cells, based on the handover condition; before detecting a failure of the handover to the first target cell, when channel quality of a second target cell among the candidate target cells is higher than channel quality of the first target cell, stopping the handover to the first target cell; and performing a handover to the second target cell.

7 Claims, 17 Drawing Sheets

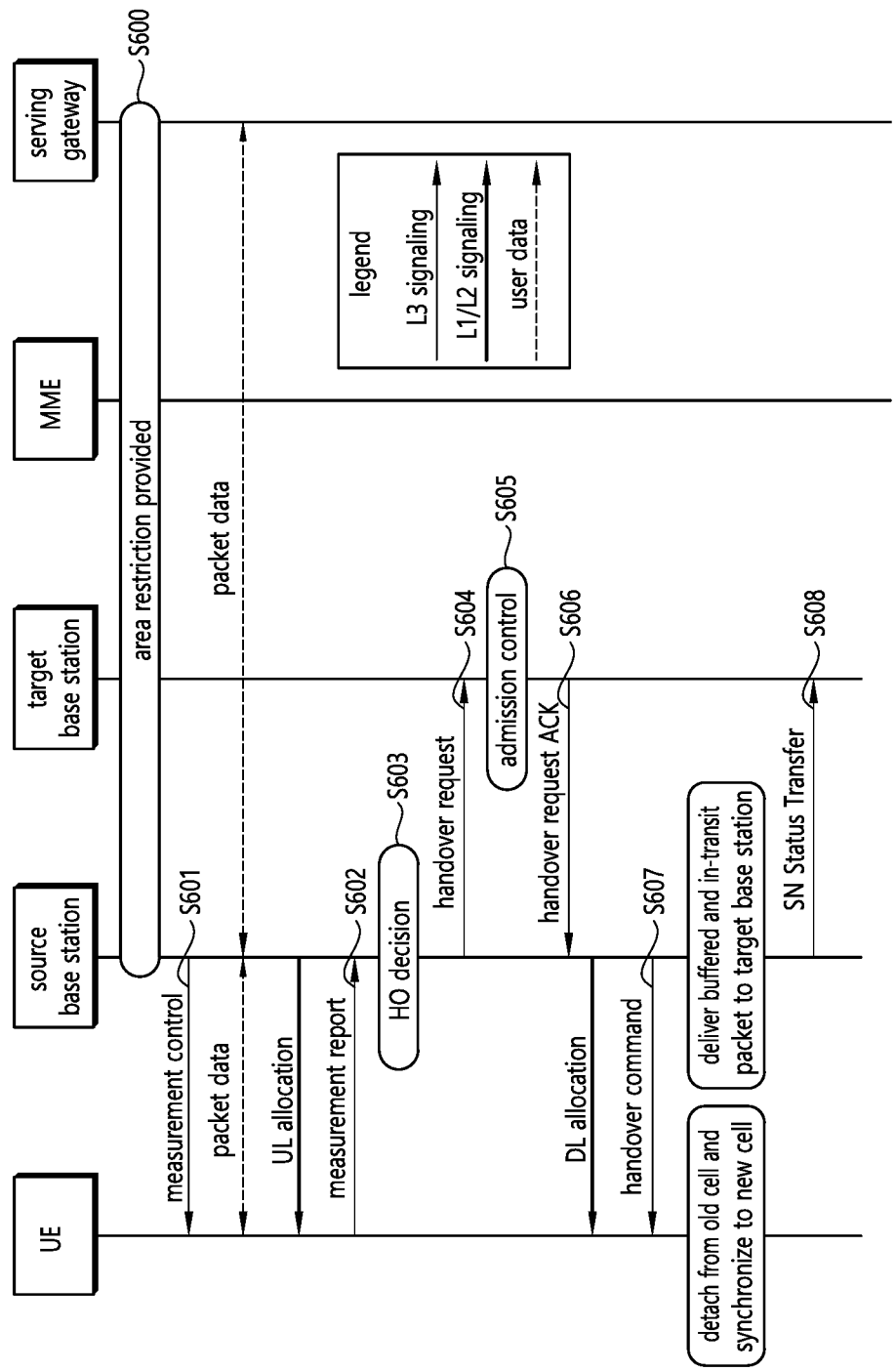

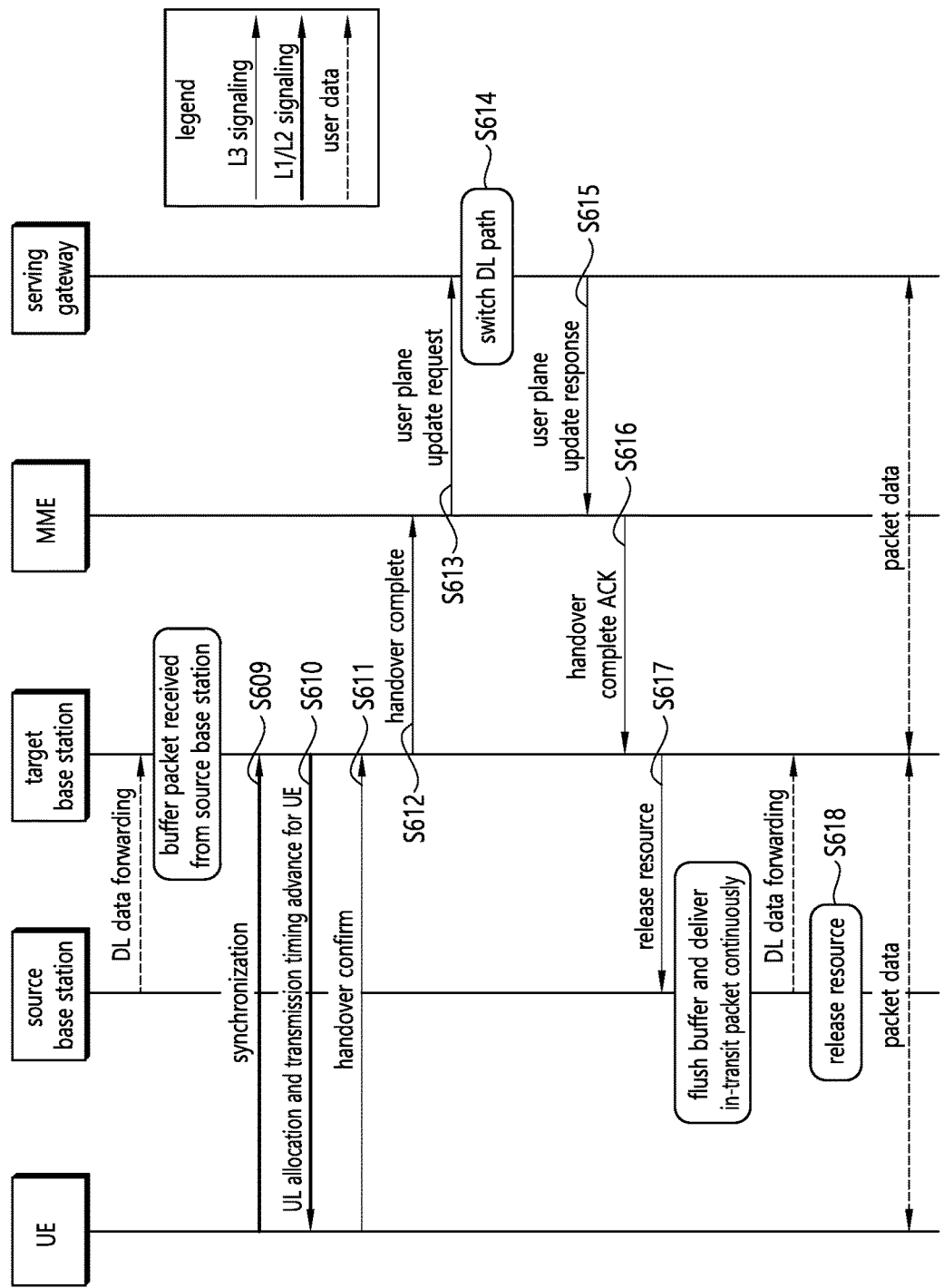

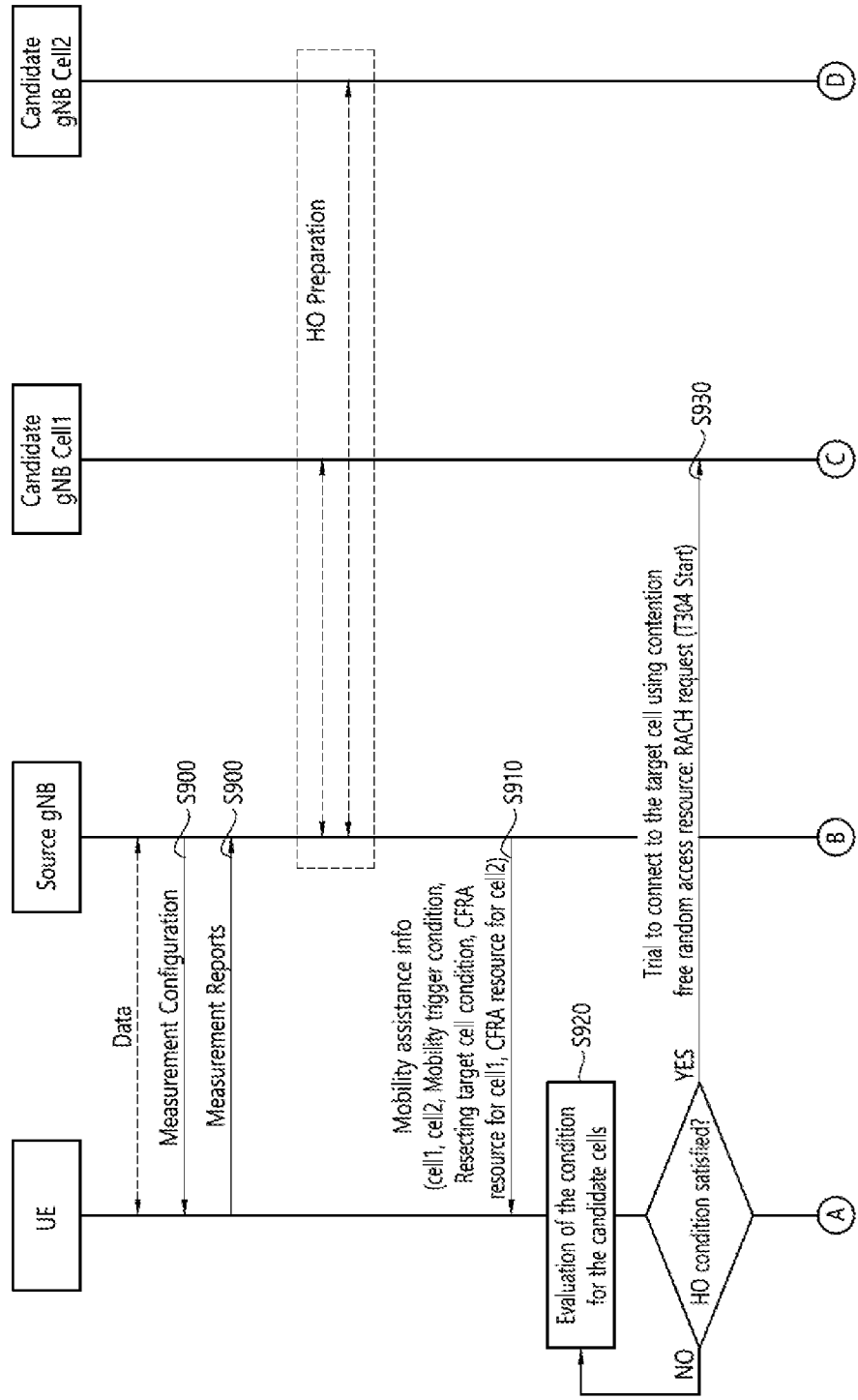

METHOD AND APPARATUS FOR PERFORMING HANDOVER

CROSS-REFERENCE TO RELATED APPLICATIONS

Pursuant to 35 U.S.C. § 119 (e), this application claims the benefit of U.S. Provisional Application No. 62/627,208, filed on Feb. 7, 2018, the contents of which are all hereby incorporated by reference herein in their entirety.

BACKGROUND OF THE INVENTION

Field of the Invention

The present invention relates to a wireless communication system, and more particularly, to a method for performing a handover to a target cell in a wireless communication system and an apparatus supporting the same.

Related Art

In order to meet the demand for wireless data traffic, which has been increasing since the commercialization of a fourth-generation (4G) communication system, efforts are being made to develop an improved fifth-generation (5G) communication system or pre-5G communication system. For this reason, a 5G communication system or pre-5G communication system is referred to as a beyond-4G-network communication system or post-long-term evolution (LTE) system.

SUMMARY OF THE INVENTION

Meanwhile, in new radio (NR), one of the possible enhanced handover mechanisms is autonomous condition based on handover also known as conditional handover. According to the conditional handover, a network provides one or more conditions and the radio resource configuration information for candidate target cells. Then, a UE evaluates the given conditions. If one of condition is satisfied among one or more conditions provided by the network, the UE tries to connect to the satisfied target cell. If the UE successfully connects to the target cell, the UE applies the configuration of the target cell. However, in this mobility procedure such as the conditional handover, a case of that the UE declares the failure from the selected target cell has not been discussed yet. Thus, a method for a UE to perform a handover to new target cell and an apparatus supporting the same need to be proposed.

One embodiment provides a method for performing a handover by a user equipment (UE) in a wireless communication system. The method may include: receiving information on candidate target cells for the handover and a handover condition, from a base station; initiating a handover to a first target cell among the candidate target cells, based on the handover condition; before detecting a failure of the handover to the first target cell, when channel quality of a second target cell among the candidate target cells is higher than channel quality of the first target cell, stopping the handover to the first target cell; and performing a handover to the second target cell.

Another embodiment provides a user equipment (UE) performing a handover in a wireless communication system. The UE may include: a transceiver; at least one processor; and at least one computer memory operably connectable to the at least one processor and storing instructions that, when executed, cause the at least one processor to perform operations comprising: receiving information on candidate target cells for the handover and a handover condition, from a base station; initiating a handover to a first target cell among the candidate target cells, based on the handover condition; before detecting a failure of the handover to the first target cell, when channel quality of a second target cell among the candidate target cells is higher than channel quality of the first target cell, stopping the handover to the first target cell; and performing a handover to the second target cell.

Another embodiment provides a method for performing a handover by a base station (BS) in a wireless communication system. The method may include: transmitting information on candidate target cells for the handover and a handover condition, to a user equipment (UE), wherein a handover to a first target cell is initiated by the UE among the candidate target cells based on the handover condition, wherein the handover to the first target cell is stopped by the UE before detecting a failure of the handover to the first target cell, when channel quality of a second target cell among the candidate target cells is higher than channel quality of the first target cell, and wherein a handover to the second target cell is performed by the UE.

According to an embodiment of the present invention, the UE can perform handover or random access to a new target cell without waiting for a RACH failure in a current target cell.

BRIEF DESCRIPTION OF THE DRAWINGS

FIGS. 6A and 6B show an example of a handover procedure to which technical features of the present invention may be applied.

FIGS. 9A to 9D show a procedure for reselecting target cell in conditional handover procedure according to an embodiment of the present invention.

DESCRIPTION OF EXEMPLARY EMBODIMENTS

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

Figure 1:
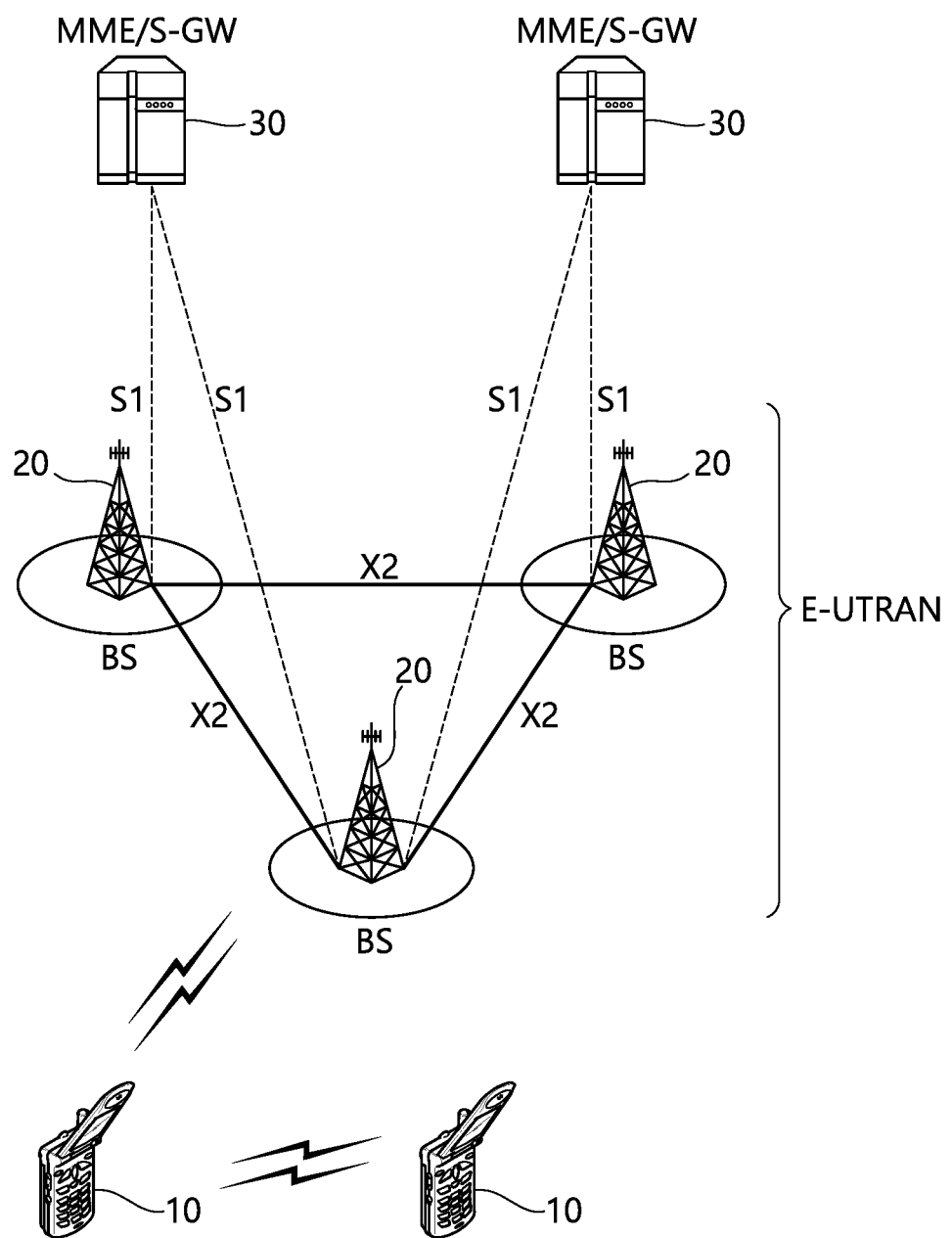
FIG. 1 shows an example of a wireless communication system to which technical features of the present invention may be applied.

FIG. 1 shows an example of a wireless communication system to which technical features of the present invention may be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE; 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (MME), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

Figure 2:
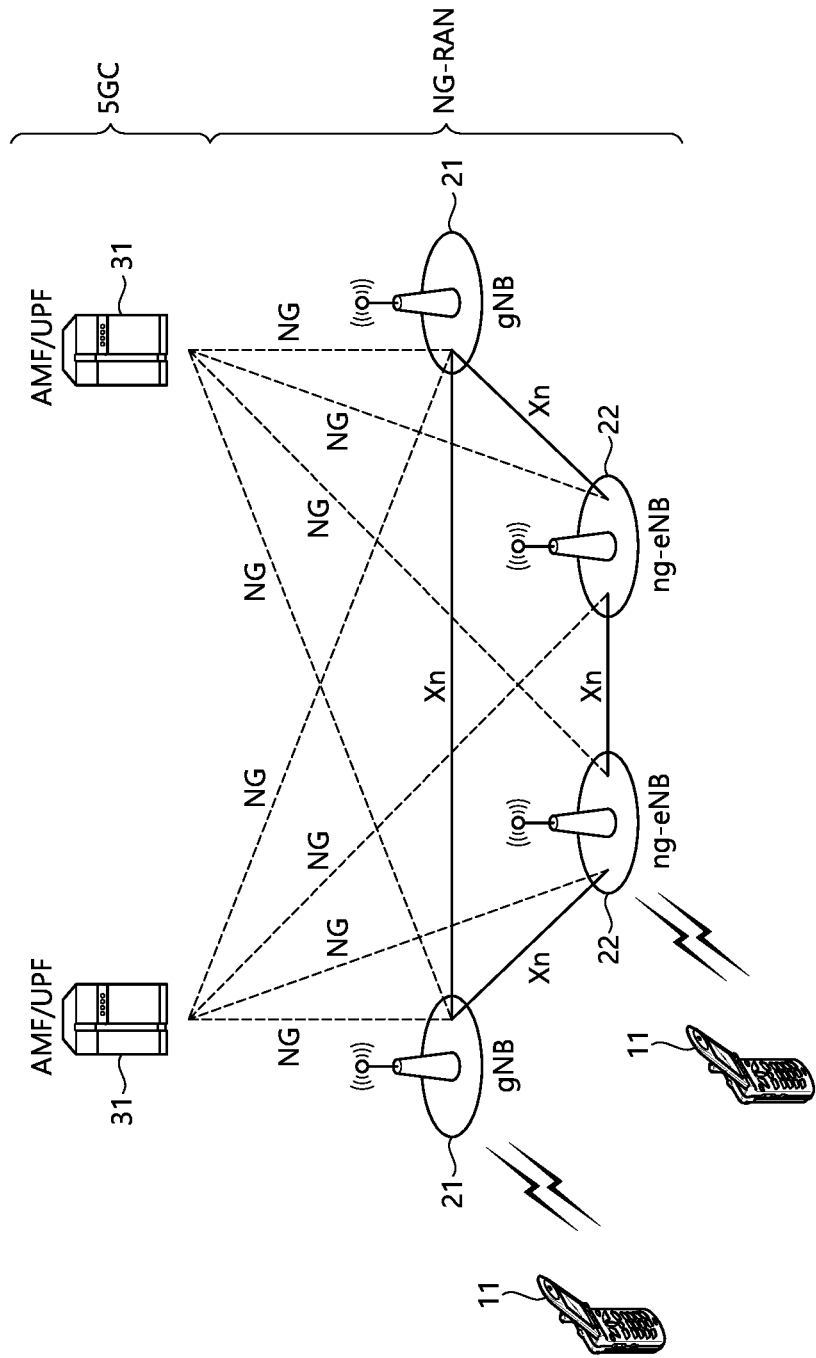
FIG. 2 shows another example of a wireless communication system to which technical features of the present invention may be applied.

FIG. 2 shows another example of a wireless communication system to which technical features of the present invention may be applied. Specifically, FIG. 2 shows a system architecture based on a 5G new radio access technology (NR) system. The entity used in the 5G NR system (hereinafter, simply referred to as "NR") may absorb some or all of the functions of the entities introduced in FIG. 1 (e.g. eNB, MME, S-GW). The entity used in the NR system may be identified by the name "NG" for distinction from the LTE/LTE-A.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 10 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A protocol structure between network entities described above is described. On the system of FIG. 1 and/or FIG. 2, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 3:
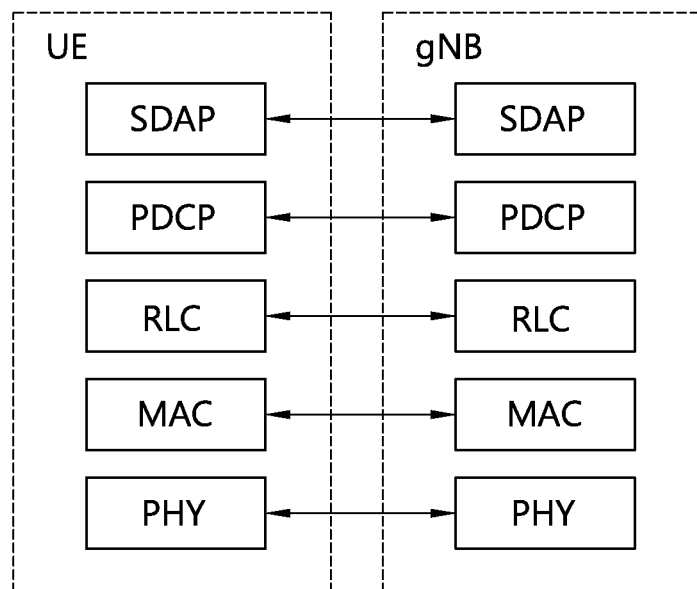
FIG. 3 shows a block diagram of a user plane protocol stack to which technical features of the present invention may be applied.
Figure 4:
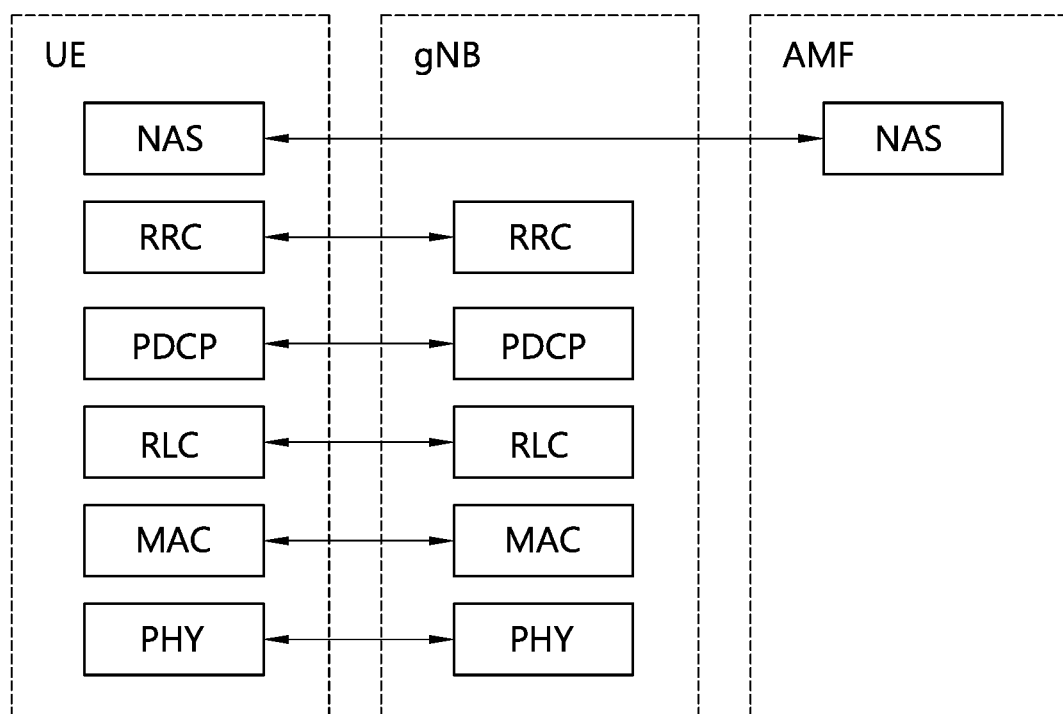
FIG. 4 shows a block diagram of a control plane protocol stack to which technical features of the present invention may be applied.

FIG. 3 shows a block diagram of a user plane protocol stack to which technical features of the present invention may be applied. FIG. 4 shows a block diagram of a control plane protocol stack to which technical features of the present invention may be applied. The user/control plane protocol stacks shown in FIG. 3 and FIG. 4 are used in NR. However, user/control plane protocol stacks shown in FIG. 3 and FIG. 4 may be used in LTE/LTE-A without loss of generality, by replacing gNB/AMF with eNB/MME.

Referring to FIG. 3 and FIG. 4, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the base station.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (01-DM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 5:
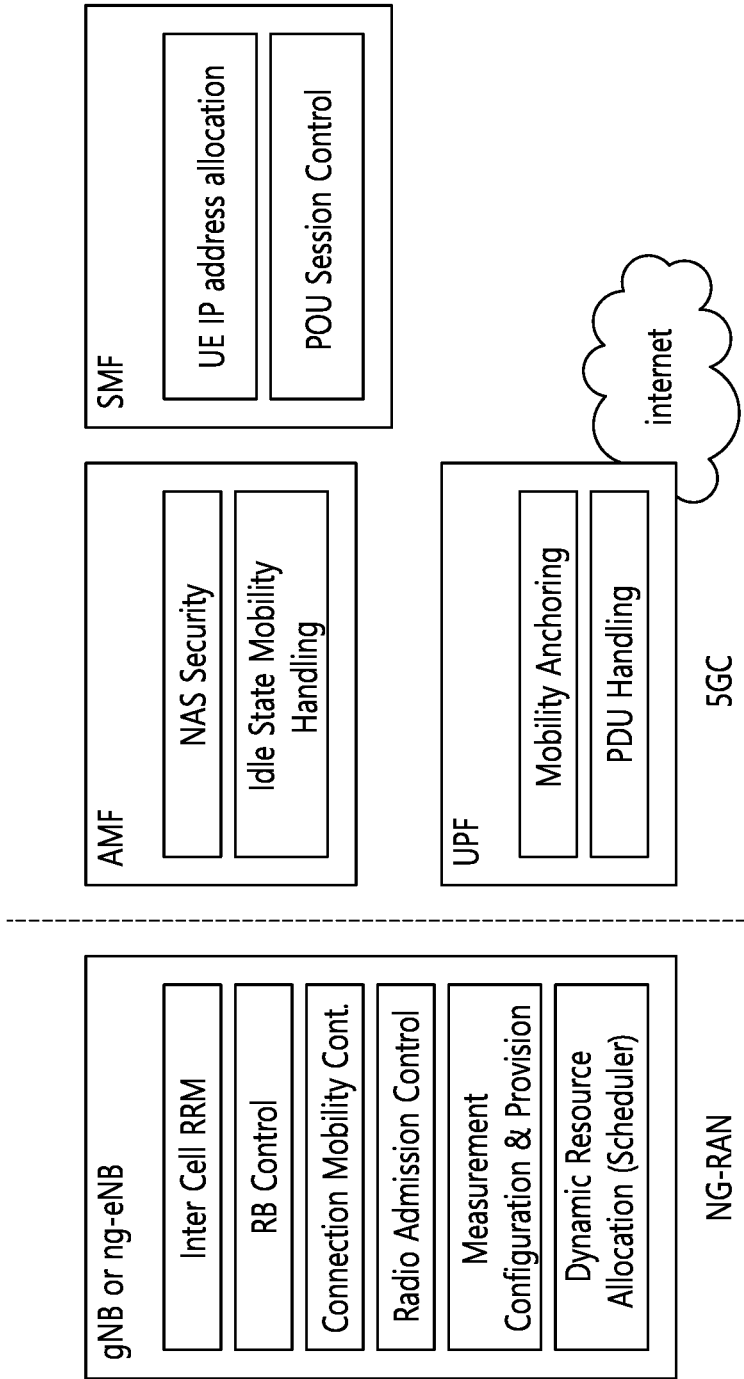
FIG. 5 shows functional split between NG-RAN and 5GC to which technical features of the present invention may be applied.

FIG. 5 shows functional split between NG-RAN and 5GC to which technical features of the present invention may be applied.

Referring to FIG. 5, the gNB and ng-eNB may host the following functions:

Functions for Radio Resource Management: Radio Bearer Control, Radio Admission Control, Connection Mobility Control, Dynamic allocation of resources to UEs in both uplink and downlink (scheduling);

IP header compression, encryption and integrity protection of data;

Selection of an AMF at UE attachment when no routing to an AMF can be determined from the information provided by the UE;

Routing of User Plane data towards UPF(s);

Routing of Control Plane information towards AMF;

Connection setup and release;

Scheduling and transmission of paging messages;

Scheduling and transmission of system broadcast information (originated from the AMF or O&M);

Measurement and measurement reporting configuration for mobility and scheduling;

Transport level packet marking in the uplink;

Session Management;

Support of Network Slicing;

QoS Flow management and mapping to data radio bearers;

Support of UEs in RRC_INACTIVE state;

Distribution function for NAS messages;

Radio access network sharing;

Dual Connectivity;

Tight interworking between NR and E-UTRA.

The Access and Mobility Management Function (AMF) may host the following main functions:

NAS signalling termination;

NAS signalling security;

AS Security control;

Inter CN node signalling for mobility between 3GPP access networks;

Idle mode UE Reachability (including control and execution of paging retransmission);

Registration Area management;

Support of intra-system and inter-system mobility;

Access Authentication;

Access Authorization including check of roaming rights;

Mobility management control (subscription and policies);

Support of Network Slicing;

SMF selection.

The User Plane Function (UPF) may host the following main functions:

Anchor point for Intra-/Inter-RAT mobility (when applicable);

External PDU session point of interconnect to Data Network;

Packet routing & forwarding;

Packet inspection and User plane part of Policy rule enforcement;

Traffic usage reporting;

Uplink classifier to support routing traffic flows to a data network;

Branching point to support multi-homed PDU session;

QoS handling for user plane, e.g. packet filtering, gating, UL/DL rate enforcement;

Uplink Traffic verification (SDF to QoS flow mapping);

Downlink packet buffering and downlink data notification triggering.

The Session Management function (SMF) may host the following main functions:

Session Management;

UE IP address allocation and management;

Selection and control of UP function;

Configures traffic steering at UPF to route traffic to proper destination;

Control part of policy enforcement and QoS;

Downlink Data Notification.

Hereinafter, measurements will be described.

A network may configure an RRC_CONNECTED UE to perform measurements and report them in accordance with the measurement configuration. The measurement configuration may be provided by means of dedicated signaling, e.g., using an RRC reconfiguration.

The network may configure the UE to perform the following types of measurements:

NR measurements;

Inter-RAT measurements of E-UTRA frequencies.

The network may configure the UE to report the following measurement information based on SS/PBCH block(s):

Measurement results per SS/PBCH block;

Measurement results per cell based on SS/PBCH block(s);

SS/PBCH block(s) indexes.

The network may configure the UE to report the following measurement information based on CSI-RS resources:

Measurement results per CSI-RS resource;

Measurement results per cell based on CSI-RS resource(s);

CSI-RS resource measurement identifiers.

The measurement configuration includes the following parameters:

(1) Measurement objects: A list of objects on which the UE shall perform the measurements.

(2) Reporting configurations: A list of reporting configurations where there can be one or multiple reporting configurations per measurement object. Each reporting configuration consists of the following:

Reporting criterion: The criterion that triggers the UE to send a measurement report. This can either be periodical or a single event description.

RS type: The RS that the UE uses for beam and cell measurement results (SS/PBCH block or CSI-RS).

Reporting format: The quantities per cell and per beam that the UE includes in the measurement report (e.g. RSRP) and other associated information such as the maximum number of cells and the maximum number beams per cell to report.

(3) Measurement identities: A list of measurement identities where each measurement identity links one measurement object with one reporting configuration. By configuring multiple measurement identities, it is possible to link more than one measurement object to the same reporting configuration, as well as to link more than one reporting configuration to the same measurement object. The measurement identity is also included in the measurement report that triggered the reporting, serving as a reference to the network.

(4) Quantity configurations: The quantity configuration defines the measurement filtering configuration used for all event evaluation and related reporting, and for periodical reporting of that measurement. For NR measurements, the network may configure up to 2 quantity configurations with a reference in the NR measurement object to the configuration that is to be used. In each configuration, different filter coefficients can be configured for different measurement quantities, for different RS types, and for measurements per cell and per beam.

(5) Measurement gaps: Periods that the UE may use to perform measurements, i.e. no (UL, DL) transmissions are scheduled.

A UE in RRC_CONNECTED maintains a measurement object list, a reporting configuration list, and a measurement identities list according to signalling and procedures in this specification. The measurement object list possibly includes NR measurement object(s) and inter-RAT objects. Similarly, the reporting configuration list includes NR and inter-RAT reporting configurations. Any measurement object can be linked to any reporting configuration of the same RAT type. Some reporting configurations may not be linked to a measurement object. Likewise, some measurement objects may not be linked to a reporting configuration.

Hereinafter, a handover procedure will be described.

FIGS. 6A and 6B show an example of a handover procedure to which technical features of the present invention may be applied. Specifically, FIGS. 6a and 6b show a handover procedure when an MME and an S-GW are not changed. The handover procedure is described below in detail.

Referring to FIG. 6A, in step S600, a UE context within a source base station may include information regarding a roaming restriction provided either at connection establishment or at the last tracking area (TA) update.

In step S601, the source base station may configure UE measurement procedures according to access restriction information. Measurements provided by the source base station may assist a function controlling UE's connection mobility.

In step S602, a measurement report may be triggered and transmitted to the base station.

In step S603, the source base station may make decision based on the measurement report and radio resource management (RRM) information to hand off the UE.

In step S604, the source base station may transmit information necessary for handover to a target base station through a handover request message. The information necessary for handover may include a UE X2 signalling context reference, a UE S1 EPC signalling context reference, a target cell ID, an RRC context including a UE identifier (e.g., cell radio network temporary identifier (C-RNTI)) in the source base station, or the like.

In step S605, admission control may be performed by the target base station dependent on the received E-RAB QoS information to increase the likelihood of a successful handover, if resources can be granted by the target base station.

In step S606, the target base station may prepare a handover with L1/L2 and transmit a handover request ACK message to the source base station. The handover request ACK message may include a transparent container (RRC message) to be transmitted to the UE to perform the handover. The container may include a new C-RNTI and a target base station's security algorithm identifier. In addition, the container may further include some other parameters i.e. access parameters, SIBs, etc.

In step S607, the source base station may generate an RRC message (e.g., an RRC connection reconfiguration message) including mobility control information for the UE in order to perform the handover. The RRC connection reconfiguration message may include parameters necessary for the handover (e.g., new C-RNTI, target base station security algorithm identifier, and optionally dedicated RACH signature information, target base station SIB, etc.), and may command to perform the handover.

In step S608, the source base station may transmit a serial number (SN) status transfer message to the target base station to convey an uplink PDCP SN receiver status and a downlink PDCP SN transmitter status.

Referring to FIG. 6B, in step S609, after receiving the RRC connection reconfiguration message including the mobility control information, the UE may perform synchronization with the target base station and access a target cell through an RACH. If a dedicated RACH preamble is allocated, the RACH is performed in a contention-free manner, and otherwise, is performed in a contention-based manner.

In step S610, the target base station may respond with uplink allocation and timing advance.

In step S611, when the UE has successfully accessed the target cell, the UE may transmit an RRC connection reconfiguration complete message (C-RNTI) to confirm the handover, along with an uplink buffer status report, to inform the target base station that the handover procedure is complete. The target base station may verify the C-RNTI transmitted in the RRC connection reconfiguration complete message. The target base station can now begin transmitting data to the UE.

In step S612, the target base station may transmit a path switch request message to an MME to inform that the UE has changed a cell.

In step S613, the MME may transmit a user plane update request message to an S-GW.

In step S614, the S-GW may switch a downlink data path to a target side. The S-GW may transmit an end marker packet on the old path to the source base station and thereafter may release a user plane/TNL resource towards the source base station.

In step S615, the S-GW may transmit a user plane update response message to the MME.

In step S616, the MME may respond to the path switch request message by using a path switch request ACK message.

In step S617, by transmitting a UE context release message, the target base station may inform a success of the handover to the source base station and may trigger the release of resources by the source base station.

In step S618, upon reception of the UE context release message, the source base station may release a radio resource and a user plane related resource associated with the UE context.

Hereinafter, a network controlled mobility will be described.

Network controlled mobility may be applied for the UE in RRC_CONNECTED and is dealt with or without RRC. The RRC driven mobility may be responsible for the cell level mobility, i.e. handover. For inter-gNB handover, the signaling procedures includes at least the following elemental components illustrated in FIG. 7.

Figure 7:
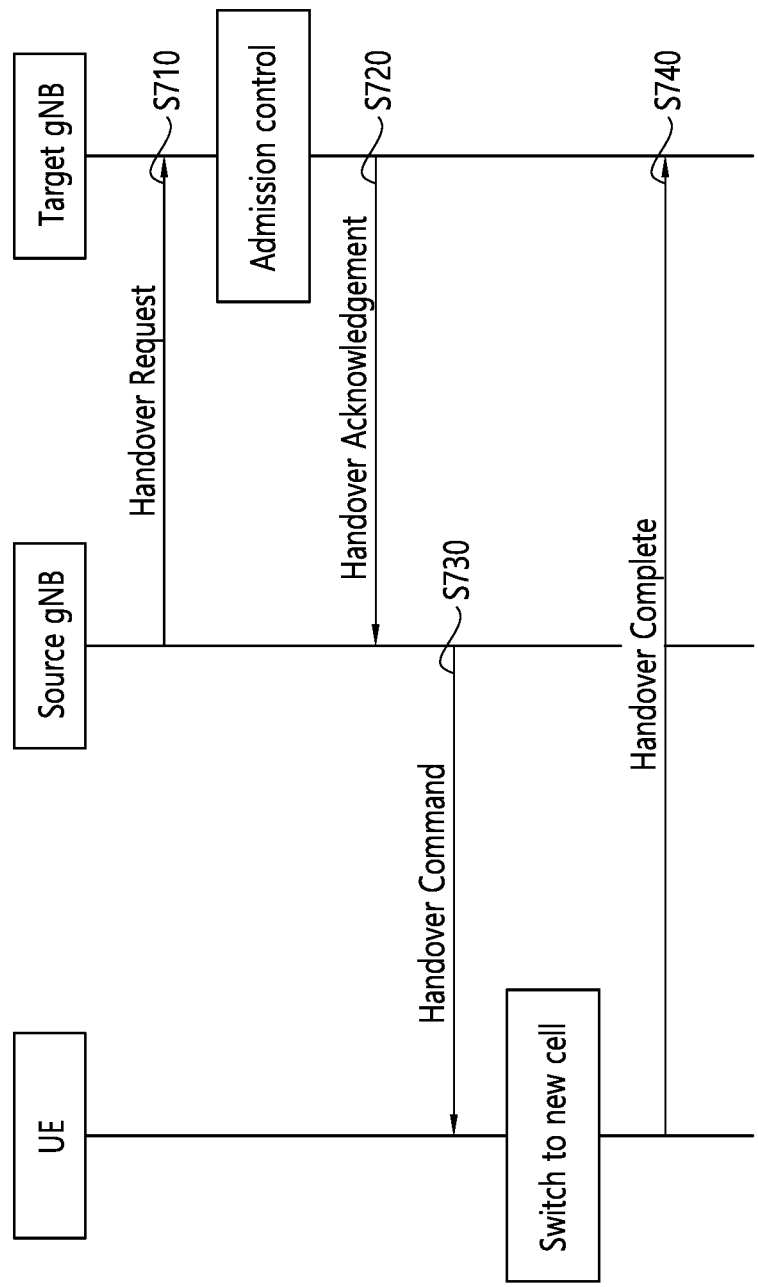
FIG. 7 shows an example of an inter-gNB handover procedure to which technical features of the present invention may be applied.

FIG. 7 shows an example of an inter-gNB handover procedure to which technical features of the present invention may be applied.

Referring to FIG. 7, in step S710, a source gNB may initiate handover and issue a handover request over the Xn interface.

In step S720, a target gNB may perform admission control and provide a RRC configuration as part of a handover acknowledgement.

In step S730, the source gNB may provide the RRC configuration to the UE in a handover command. The handover command message may include at least cell ID and all information required to access the target cell so that the UE can access the target cell without reading system information. For some cases, the information required for contention based and contention free random access can be included in the handover command message. The access information to the target cell may include beam specific information, if any.

In step S740, the UE may move the RRC connection to the target gNB and replies a handover complete.

Meanwhile, in new radio (NR), one of the possible enhanced handover mechanisms is autonomous condition based handover also known as conditional handover. According to the conditional handover, a network provides one or more conditions and the radio resource configuration information for candidate target cells. Then, a UE evaluates the given conditions. If one of condition is satisfied among one or more conditions provided by the network, the UE tries to connect to the satisfied target cell. If the UE successfully connects to the target cell, the UE applies the configuration of the target cell. However, in this mobility procedure such as the conditional handover, a case of that the UE declares the failure from the selected target cell has not been discussed yet.

Hereinafter, a method for a UE to perform a handover to new target cell and an apparatus supporting the same according to an embodiment of the present invention are described in detail.

Figure 8:
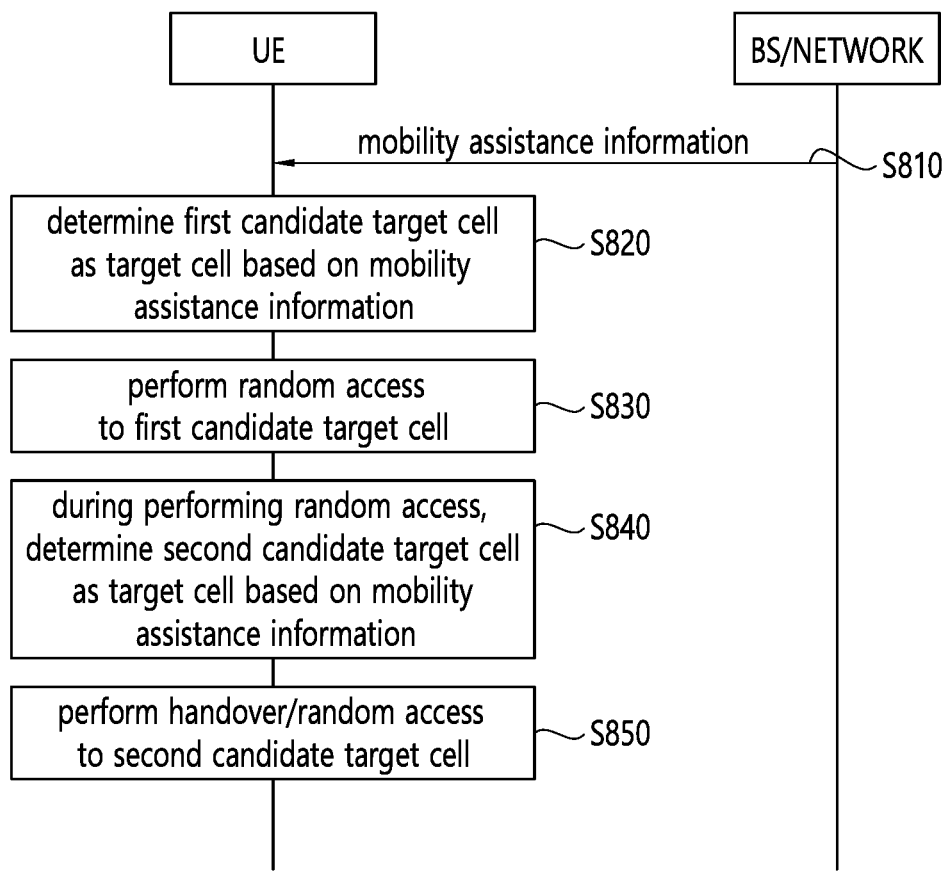
FIG. 8 shows a procedure for selecting a target cell according to an embodiment of the present invention.

FIG. 8 shows a procedure for selecting a target cell according to an embodiment of the present invention.

Referring to FIG. 8, in step S810, a network may provide a UE with mobility assistance information for conditional mobility. For instance, the network may be a base station. For instance, the conditional mobility may be conditional handover or conditional secondary cell group (SCG) change. The mobility assistance information may be provided to the UE via dedicated signaling. The mobility assistance information may include one or more followings:

(1) Cell identities of one or more candidate target cells (2) Radio resource configuration information for each candidate target cell (3) Random access information (e.g. time information, frequency information, preamble information or beam identity) for each candidate target cell (4) Conditional mobility triggering condition The conditional mobility triggering condition (i.e. triggering condition for conditional mobility) may include channel quality threshold for a serving cell. In this specification, for instance, the channel quality may be reference signal received power (RSRP) or reference signal received quality (RSRQ). For instance, the channel quality may be measured based on channel status information—reference signal (CSI-RS).

The conditional mobility triggering condition may include channel quality threshold for each candidate target cell comparing with channel quality of a serving cell. For instance, one common threshold may be provided for all candidate target cell. Alternatively, for instance, different threshold may be provided for each candidate target cell.

(5) Reselecting candidate target cell condition for conditional mobility

The reselecting candidate target cell condition (i.e. condition for reselecting candidate target cell) may include channel quality threshold for each candidate target cell comparing with channel quality of the other target candidate cells. For instance, one common threshold may be provided for all candidate target cell. Alternatively, for instance, different threshold may be provided for each candidate target cell. Further, the reselecting candidate target cell condition may include at least one offset value for each candidate target cell. The offset value may be used for adjusting the channel quality threshold for each candidate target cell for helping to be a reliable condition to trigger reselecting candidate target cell. The offset value may be provided with above channel quality threshold. Further, the reselecting candidate target cell condition may include at least one time to trigger value for each candidate target cell. The time to trigger value may be used for concerning the time how long the reselecting candidate target cell condition(s) is/are met. The time to trigger value may be provided with above channel quality threshold.

The reselecting candidate target cell condition may include a value for counting the number of random access failure in the candidate target cell. For instance, one common value may be provided for all candidate target cell. Alternatively, for instance, different value may be provided for each candidate target cell.

The reselecting candidate target cell condition may include time based triggering information to reselect the candidate target cell. This information may be a value or a timer. If the network provides the time based triggering information as a value, the value may be used to scale a mobility validity timer. For instance, the mobility validity timer may be received from the network. For instance, the mobility validity timer may be T304 or T307. For instance, one common information may be provided for all candidate target cell. Alternatively, for instance, different value may be provided for each candidate target cell.

(6) Time based validity information

After receiving the mobility assistance information, the UE may set and start validity timer with a value included in the time based validity information. While the validity timer is running, the UE may consider the received mobility assistance information as valid.

Referring again to FIG. 8, in step S820, upon receiving the mobility assistance information for conditional mobility from the network, the UE may measure channel quality to evaluate whether a trigger condition for conditional handover is satisfied. For instance, the UE may determine that the trigger condition for conditional handover is satisfied when the channel quality of a first candidate target cell is better than the channel quality of the serving cell. For instance, the UE may determine that the trigger condition for conditional handover is satisfied when the channel quality of a first candidate target cell is equal or above a threshold for the first candidate target cell and the channel quality of the serving cell is equal or below a threshold for the serving cell. The threshold for the first candidate target cell and the threshold for the serving cell may be received from the network by being included in the mobility assistance information in step S810. When the UE determines that the trigger condition for conditional handover is satisfied for the first candidate target cell based on the channel quality of the first candidate target cell, the UE may consider the first candidate target cell as a target cell for the conditional handover. Namely, if the conditional mobility triggering condition is satisfied by the first candidate target cell, the UE may regard the first candidate target cell as a target cell for conditional mobility.

In step S830, after determining the first candidate target cell as the target cell for the conditional handover, the UE may perform random access to the target cell, i.e., first candidate target cell. In other words, the UE may initiate handover to the target cell, i.e., first candidate target cell.

In step S840, during performing random access to the target cell in the procedure of conditional mobility, the UE may measure channel quality of all the received candidate target cells to evaluate whether at least one trigger condition to re-select to another target cell for conditional mobility is satisfied. When at least one following trigger condition is satisfied, the UE may trigger reselecting to another target cell, e.g., a second candidate target cell.

(1) Condition 1: the channel quality of the second candidate target cell is better than the channel quality of the target cell while the mobility validity timer (e.g. T304 or T307) is running (i.e. during the conditional mobility procedure). For instance, when the channel quality of the second candidate target cell is better than the channel quality of the target cell while the mobility validity timer is running, the UE may determine the second candidate target cell as a new target cell for conditional mobility. For instance, when the channel quality of the second candidate target cell is equal or above a threshold for the second candidate target cell and the channel quality of the target cell is below a threshold for re-selecting a new target cell, the UE may determine the second candidate target cell as a new target cell for conditional mobility. The threshold for the second candidate target cell and the threshold for re-selecting the new target cell may be received from the network by being included in the mobility assistance information in step S810. Further, if the UE receives an offset value, 'channel quality threshold+offset' may be considered for the threshold. Further, if the UE receives a time to trigger value, the UE may trigger to reselect the second candidate target cell after the received time to trigger value.

(2) Condition 2: the certain number of random access trial is failed in the target cell. For instance, if the network provides a value 'N' for counting the number of random access failure for the target cell, the UE may count the number of random access trial whenever the random access trial is failed in the target cell. If random access is failed N times on the target cell, the UE may trigger to reselect a new target cell among the candidate target cells. For instance, if random access is failed N times on the first candidate target cell, the UE may reselect the second candidate target cell.

(3) Condition 3: the certain time has passed without random access success on the target cell. For instance, if the network provides the time based triggering information to reselect the candidate target cell, a new timer may be used to trigger target cell reselection. Upon random access is succeeded by the target cell, the new timer is stopped. However random access has not been succeeded until the new timer had expired, the UE triggers to reselect target cell, e.g., second candidate target cell, among the candidate target cell.

This time based triggering information may be provided by at least one scale value or at least one absolute timer value.

If the UE receives the scale value for time based triggering information from the network, when the UE starts mobility validity timer (e.g. T304 or T307), the UE may start a new timer which has a scaled timer value based the mobility validity timer. For instance, if the scale value is 0.5 for handover, timer value is 0.5*T304. For instance, if the scale value is 0.5 for SCG change, timer value is 0.5*T307.

If the UE receives the absolute timer value for time based triggering information from the network, the UE starts the timer when the UE starts mobility validity timer (e.g. T304 or T307) following the given mobility assistance information e.g. conditional handover start or SCG change start.

Based on at least one condition included in the mobility assistance information, the UE may determine the second candidate target cell as a new target cell. That is, if the given triggering condition(s) for re-selecting target cell is/are met during conditional mobility (e.g. during the timer (e.g. T304) for conditional mobility is running), the UE may regard the candidate target cell as a new target cell for conditional handover. Thus, the UE may stop performing random access to the first candidate target cell.

Then, in step S850, the UE may performs random access or handover to the new target cell.

According to an embodiment of the present invention, the UE can perform handover or random access to the second candidate target cell without waiting for the RACH failure in the first candidate target cell.

FIGS. 9A to 9D show a procedure for reselecting target cell in conditional handover procedure according to an embodiment of the present invention.

Referring to FIG. 9A, in step S900, the network may configure measurement configuration, and the UE may report the measured results to the network for a cell 1 and a cell 2. The network may prepare the cell 1 and the cell 2.

In step S910, the UE may receive mobility assistance information which includes at least one or cell identities (i.e. cell 1 and cell 2) of one or more candidate target cells, radio resource configuration information for each candidate target cell, random access information (e.g. time/frequency/preamble/beam identity) for each candidate target cell, conditional mobility triggering condition, reselecting candidate target cell condition or validity timer for the mobility assistance information. After receiving the mobility assistance information, the UE may set the validity timer with the received value and start the timer.

In step S920, the UE may measure at least one neighboring cell including candidate neighboring cells listed in the mobility assistance information and evaluate conditional mobility triggering condition.

In step S930, the UE may start the mobility timer (e.g. T304) when the trigger condition is satisfied to perform conditional handover towards a target candidate cell. The timer value may be provided as part of the mobility assistance information. The UE may try to connect toward the selected target cell using contention free random access resources i.e. contention free random access (CFRA) procedure. Thus, RACH request may be transmitted to the target cell, i.e., cell 1.

Figure 9B:
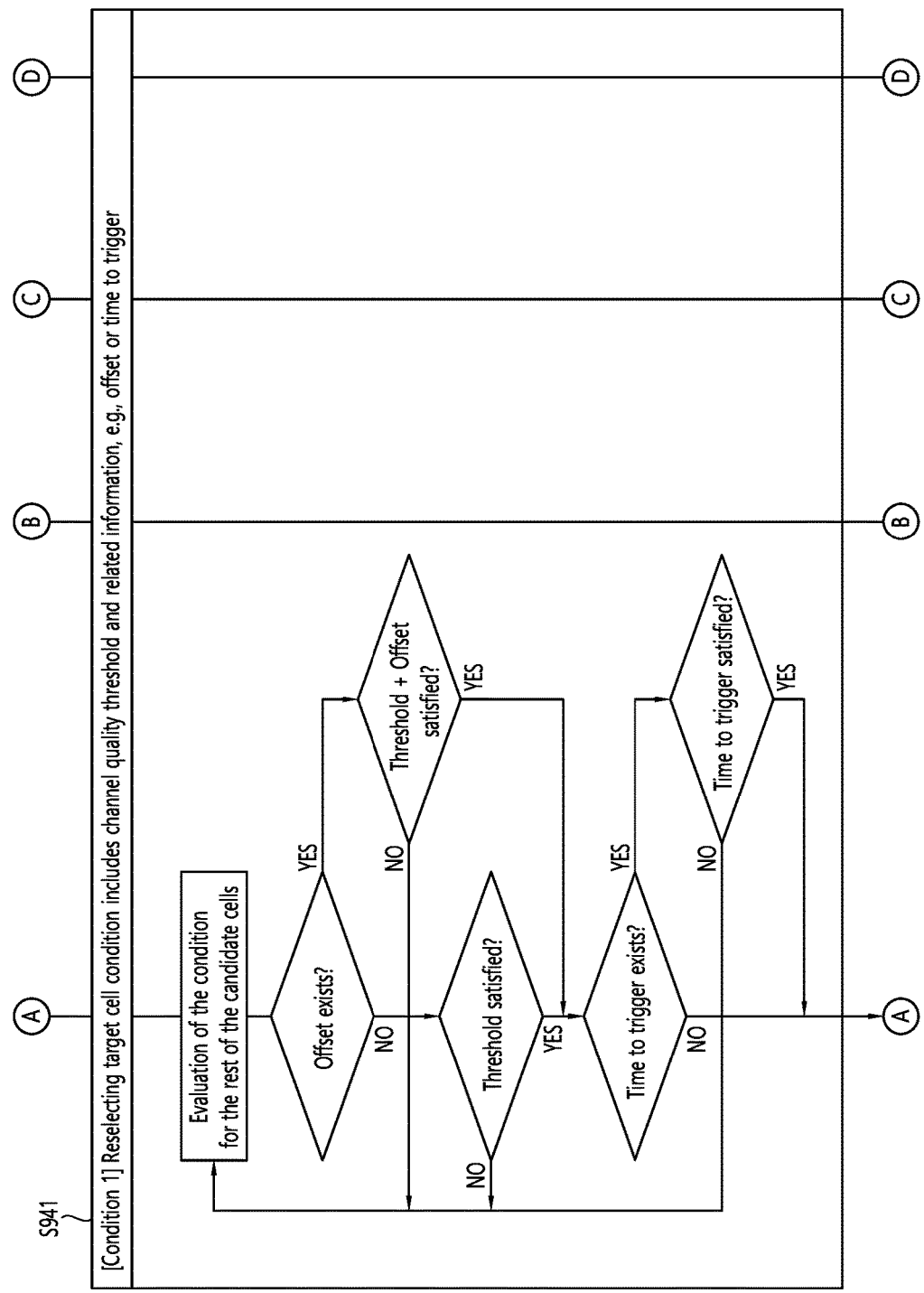

Referring to FIG. 9B, in step S941, the UE may measure the rest of the candidate cells except the selected target cell and compare the measured channel quality of each candidate cell with the received channel quality threshold for each candidate cell. Channel quality of one of the candidate cells (i.e., cell 2) becomes better than the one of the target cell because the channel quality of the cell 2 is above the received channel quality threshold considering received the offset and the time to trigger value.

Figure 9C:
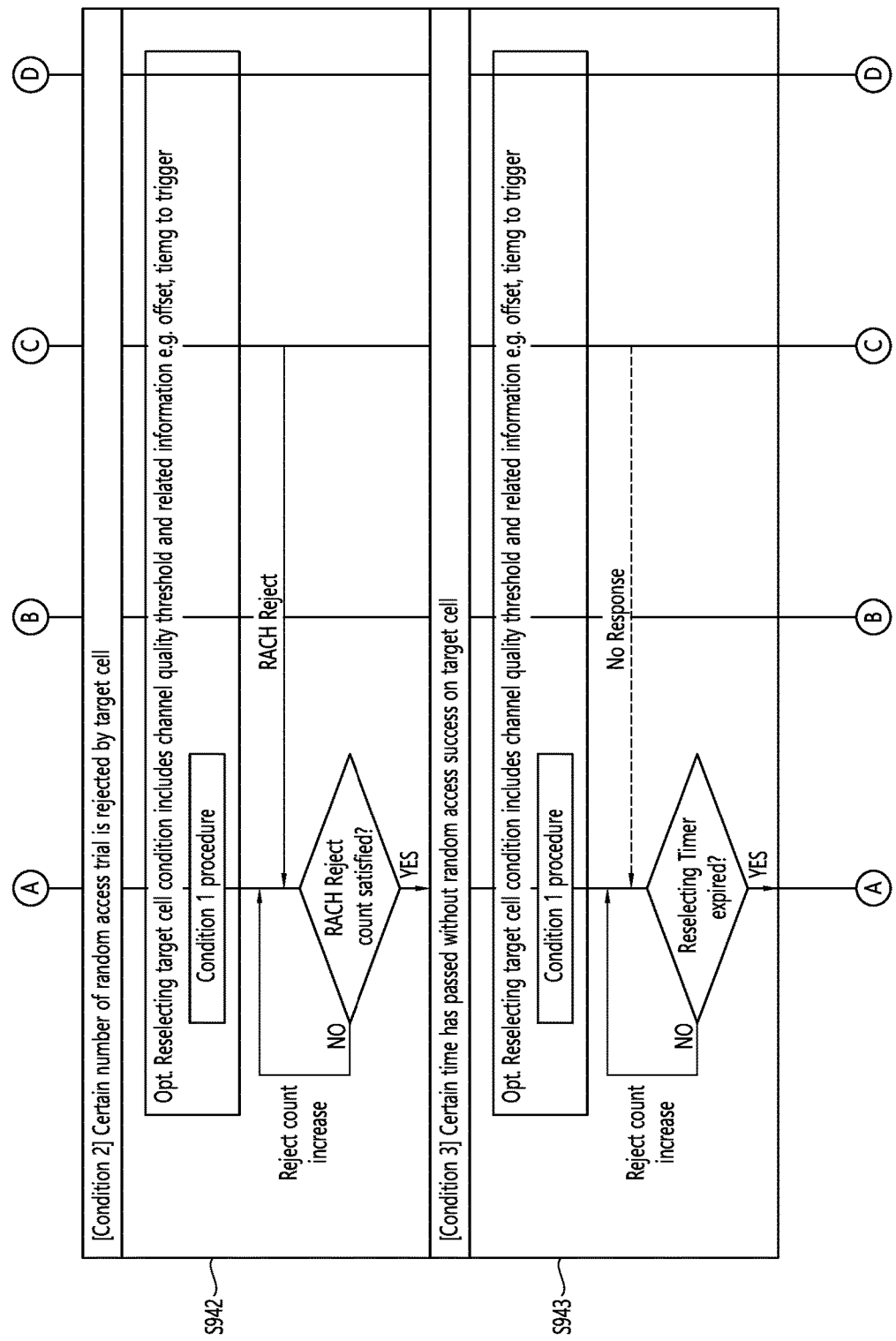

Referring to FIG. 9C, in step S942, using the received channel quality threshold for each candidate target, the UE may measure the rest of the candidate cells except the selected target cell if available. During RACH procedure, UE may count the number of the RACH trial whenever RACH request is failed in the target cell. The UE may regard the target cell as inappropriate cell when the counting number of RACH trial becomes more than the allowed number of RACH trial.

In step S943, using the received channel quality threshold for each candidate target cell, the UE may measure the rest of the candidate cells except the selected target cell if available. The UE may start a timer to reselect another target cell upon initiating RACH procedure on the target cell using information which is received by the information of the reselecting candidate target cell condition in the mobility assistance information (e.g. new timer value or T304 scaling value). Upon expiry of the new timer, the UE may regard the target cell as inappropriate cell.

In the embodiment of FIGS. 9B and 9C, the UE may skip at least one of S941, S942 or S943 based on the mobility assistance information.

Figure 9D:
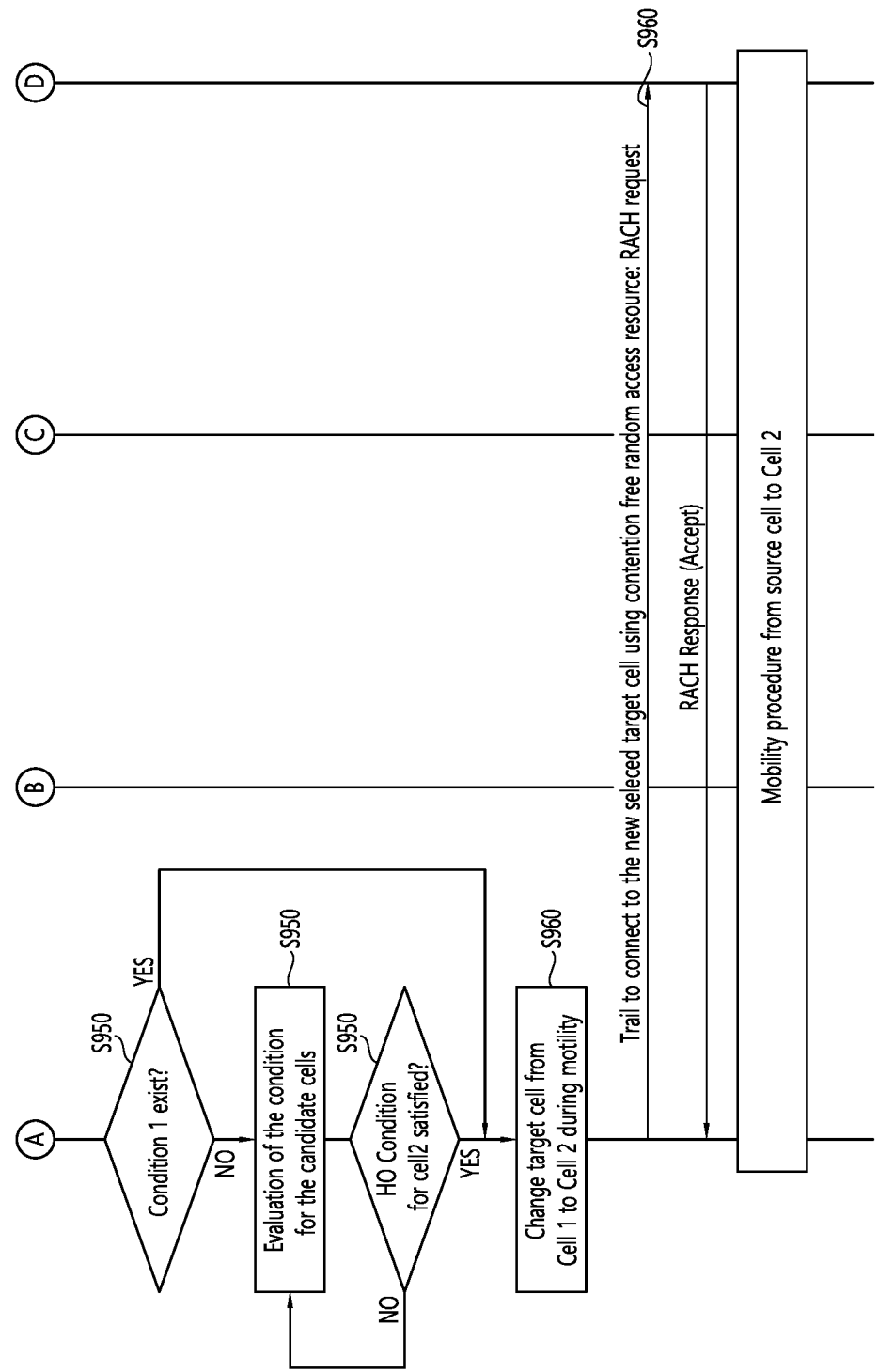

Referring to FIG. 9D, in step S950, if at least one trigger condition (i.e., S941, S942 or S943) includes threshold based condition (i.e., S941) to reselect target cell, the UE can make a decision which cell can be a next target cell without additional candidate cell evaluation. Otherwise, i.e., S942 or S943 without S941, to reselect target cell during conditional handover, the UE may evaluate the rest of the candidate target cell except the target cell using the mobility assistance information if there is no next target cell information.

In step S960, following the reselect condition(s) and evaluation, the UE may stop RACH procedure towards the target cell (i.e., cell 1). The UE may try to connect towards the newly selected target cell using contention free random access resources i.e. CFRA procedure. Thus, RACH request may be transmitted to the new target cell (i.e., cell 2). In this procedure of reselecting target cell, the mobility timer (e.g., T304) may be kept going on without interruption.

Figure 10:
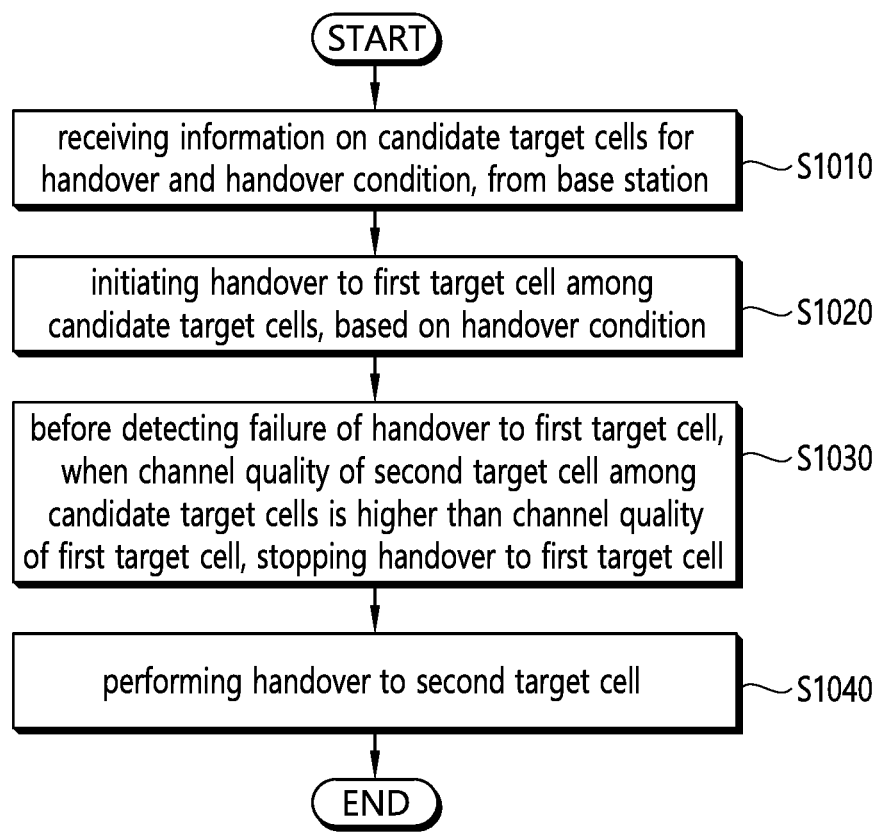
FIG. 10 shows a method for performing a handover by a UE according to an embodiment of the present invention.

FIG. 10 shows a method for performing a handover by a UE according to an embodiment of the present invention. The present invention described above for UE side may be applied to this embodiment.

Referring to FIG. 10, in step S1010, the UE may receive information on candidate target cells for the handover and a handover condition, from a base station. The information on candidate target cells for the handover may include at least one of cell identities of the candidate target cells, radio resource configuration information for the candidate target cells, or random access information for the candidate target cells. The random access information for the candidate target cells may include at least one of time information, frequency information, preamble information or beam information for the random access to the candidate target cells.

In step S1020, the UE may initiate a handover to a first target cell among the candidate target cells, based on the handover condition. The step of initiating the handover to the first target cell may comprise performing random access to the first target cell. The step of performing the random access to the first target cell may comprise transmitting a random access preamble to the first target cell. The first target cell may satisfy the handover condition, when channel quality of the first target cell is higher than channel quality of a serving cell.

Further, the UE may receive a first threshold for the first target cell and a second threshold for a serving cell. In this case, the first target cell may satisfy the handover condition, when channel quality of the first target cell is equal or above the first threshold for the first target cell and channel quality of the serving cell is equal or below the second threshold for the serving cell.

Further, the UE may receive a third threshold for the first target cell and a fourth threshold for the second target cell, from the base station. In this case, before detecting the failure of the handover to the first target cell, when channel quality of the first target cell is lower than the third threshold for the first target cell and channel quality of the second target cell is higher than the fourth threshold for the second target cell, the UE may stop the handover to the first target cell.

Further, the UE may receive a value for counting a number of rejections of random access, from the base station. The number of rejections of random access from the first target cell may reach the value.

Further, the UE may receive a timer from the base station. The handover to the first target cell may be not succeeded on the first target cell until the timer expires.

In step S1030, before detecting a failure of the handover to the first target cell, when channel quality of a second target cell among the candidate target cells is higher than channel quality of the first target cell, the UE may stop the handover to the first target cell.

Further, the UE may determine the second target cell as a new target cell.

In step S1040, the UE may perform a handover to the second target cell. The step of performing the handover to the second target cell may comprise performing random access to the second target cell. The random access may be performed to the second target cell based on contention free random access resources.

According to an embodiment of the present invention, the UE can perform handover or random access to the second target cell without waiting for the RACH failure in the first target cell.

Figure 11:
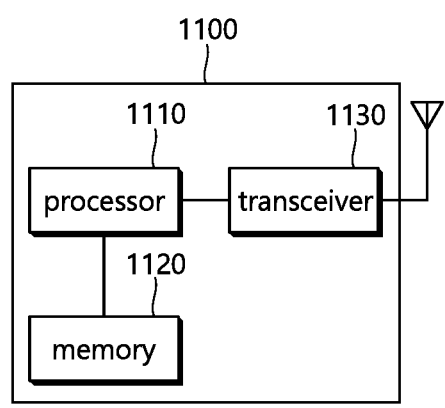
FIG. 11 shows a UE to implement an embodiment of the present invention.

FIG. 11 shows a UE to implement an embodiment of the present invention. The present invention described above for UE side may be applied to this embodiment.

A UE 1100 includes a processor 1110, a memory 1120 and a transceiver 1130. The processor 1110 may be configured to implement proposed functions, procedures and/or methods described in this description. Layers of the radio interface protocol may be implemented in the processor 1110.

Specifically, the processor 1110 may control the transceiver 1130 to receive information on candidate target cells for the handover and a handover condition, from a base station. The information on candidate target cells for the handover may include at least one of cell identities of the candidate target cells, radio resource configuration information for the candidate target cells, or random access information for the candidate target cells. The random access information for the candidate target cells may include at least one of time information, frequency information, preamble information or beam information for the random access to the candidate target cells.

Further, the processor 1110 may initiate a handover to a first target cell among the candidate target cells, based on the handover condition. The step of initiating the handover to the first target cell may comprise performing random access to the first target cell. The step of performing the random access to the first target cell may comprise transmitting a random access preamble to the first target cell. The first target cell may satisfy the handover condition, when channel quality of the first target cell is higher than channel quality of a serving cell.

Further, the processor 1110 may control the transceiver 1130 to receive a first threshold for the first target cell and a second threshold for a serving cell. In this case, the first target cell may satisfy the handover condition, when channel quality of the first target cell is equal or above the first threshold for the first target cell and channel quality of the serving cell is equal or below the second threshold for the serving cell.

Further, the processor 1110 may control the transceiver 1130 to receive a third threshold for the first target cell and a fourth threshold for the second target cell, from the base station. In this case, before detecting the failure of the handover to the first target cell, when channel quality of the first target cell is lower than the third threshold for the first target cell and channel quality of the second target cell is higher than the fourth threshold for the second target cell, the processor 1110 may stop the handover to the first target cell.

Further, the processor 1110 may control the transceiver 1130 to receive a value for counting a number of rejections of random access, from the base station. The number of rejections of random access from the first target cell may reach the value.

Further, the processor 1110 may control the transceiver 1130 to receive a timer from the base station. The handover to the first target cell may be not succeeded on the first target cell until the timer expires.

Further, before detecting a failure of the handover to the first target cell, when channel quality of a second target cell among the candidate target cells is higher than channel quality of the first target cell, the processor 1110 may stop the handover to the first target cell.

Further, the processor 1110 may determine the second target cell as a new target cell.

Further, the processor 1110 may perform a handover to the second target cell. The step of performing the handover to the second target cell may comprise performing random access to the second target cell. The random access may be performed to the second target cell based on contention free random access resources.

The memory 1120 is operatively coupled with the processor 1110 and stores a variety of information to operate the processor 1110. The transceiver 1130 is operatively coupled with the processor 1110, and transmits and/or receives a radio signal.

Figure 12:
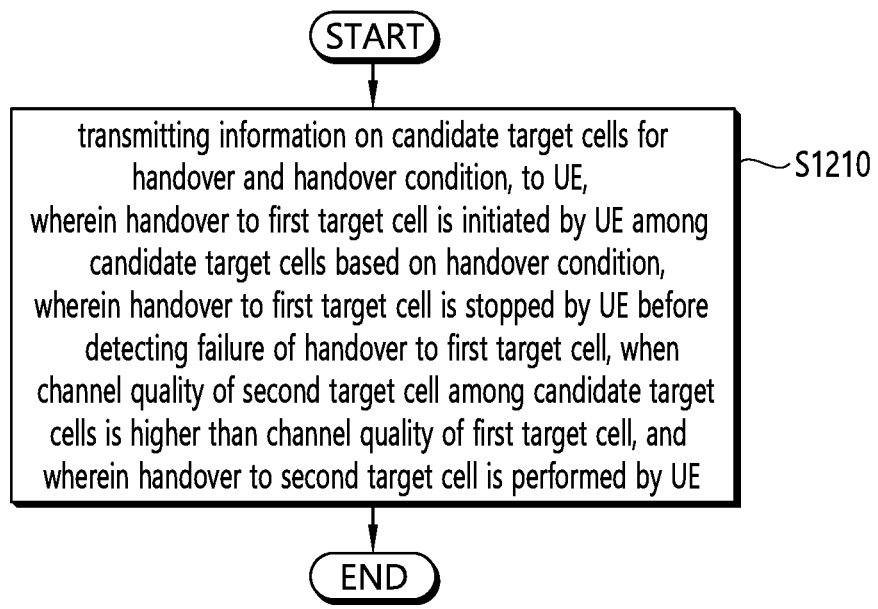
FIG. 12 shows a method for performing a handover by a BS according to an embodiment of the present invention.

FIG. 12 shows a method for performing a handover by a BS according to an embodiment of the present invention. The present invention described above for BS side may be applied to this embodiment.

Referring to FIG. 12, in step S1210, the BS may transmit information on candidate target cells for the handover and a handover condition, to a user equipment (UE). After then, a handover to a first target cell may be initiated by the UE among the candidate target cells based on the handover condition. The handover to the first target cell may be stopped by the UE before detecting a failure of the handover to the first target cell, when channel quality of a second target cell among the candidate target cells is higher than channel quality of the first target cell. Further, a handover to the second target cell may be performed by the UE.

Figure 13:
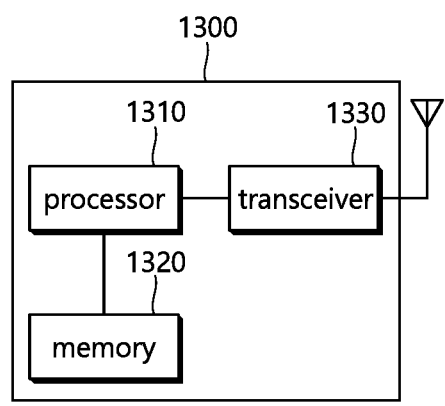
FIG. 13 shows a BS to implement an embodiment of the present invention.

FIG. 13 shows a BS to implement an embodiment of the present invention. The present invention described above for BS side may be applied to this embodiment.

A BS 1300 includes a processor 1310, a memory 1320 and a transceiver 1330. The processor 1310 may be configured to implement proposed functions, procedures and/or methods described in this description. Layers of the radio interface protocol may be implemented in the processor 1310.

Specifically, the processor 1310 may control the transceiver 1330 to transmit information on candidate target cells for the handover and a handover condition, to a user equipment (UE). After then, a handover to a first target cell may be initiated by the processor 1110 among the candidate target cells based on the handover condition. The handover to the first target cell may be stopped by the processor 1110 before detecting a failure of the handover to the first target cell, when channel quality of a second target cell among the candidate target cells is higher than channel quality of the first target cell. Further, a handover to the second target cell may be performed by the processor 1110.

The memory 1320 is operatively coupled with the processor 1310 and stores a variety of information to operate the processor 1310. The transceiver 1330 is operatively coupled with the processor 1310, and transmits and/or receives a radio signal.

The processor 1110, 1310 may include an application-specific integrated circuit (ASIC), a separate chipset, a logic circuit, and/or a data processing unit. The memory 1120, 1320 may include a read-only memory (ROM), a random access memory (RAM), a flash memory, a memory card, a storage medium, and/or other equivalent storage devices. The transceiver 1130, 1330 may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor 1110, 1310. The memory 1120, 1320 may be located inside or outside the processor 1110, 1310, and may be coupled to the processor 1110, 1310 by using various well-known means.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving, from a base station (BS), mobility assistance information informing the UE that conditional mobility is allowed, wherein the mobility assistance information includes information on candidate target cells for the conditional mobility;
   receiving, from the BS, a first threshold for a first target cell among the candidate target cells, a second threshold for a serving cell, a third threshold for the first target cell, and a fourth threshold for a second target cell among the candidate target cells;
   receiving a timer value including a first time period, where a handover to the first target cell may be not succeeded on the first target cell until the timer expires;
   measuring channel quality of the candidate target cells during the first time period;
   initiating a first random access procedure to a first target cell among the candidate target cells by transmitting a random access channel (RACH) preamble to the first target cell;
   initiating a handover to the first target cell as part of the first random access procedure, based on that a channel quality of the first target cell measured during the first time period is equal to or above the first threshold for the first target cell and a channel quality of the serving cell measured during the first time period is equal to or below the second threshold for the serving cell;
   during the first random access procedure after transmitting the RACH preamble to the first target cell:
      measuring channel quality of the candidate target cells during the first time period, based on the mobility assistance information;
      detecting that a channel quality of the second target cell measured during the first time period is greater than a channel quality of the first target cell measured during the first time period; and
      stopping the handover to the first target cell before detecting a failure of the handover to the first target cell, based on that the channel quality of the first target cell measured at the first time period is lower than the third threshold for the first target cell and the channel quality of the second target cell measured at the first time period is higher than the fourth threshold for the second target cell; and
   performing a second random access procedure to the second target cell by transmitting another RACH preamble to the second target cell based on contention free random access resources.

2. The method of claim 1, wherein the information on candidate target cells includes at least one of cell identities of the candidate target cells, radio resource configuration information for the candidate target cells, and random access information for the candidate target cells.

3. The method of claim 2, wherein the random access information for the candidate target cells includes at least one of time information, frequency information, preamble information, and beam information.

4. The method of claim 1, further comprising:
   receiving, from the BS, a value for counting a number of rejections of random access,
   wherein the number of rejections of random access from the first target cell reaches the value.

5. The method of claim 1, further comprising:
   receiving a timer from the BS,
   wherein the first random access procedure is not succeeded on the first target cell until the timer expires.

6. The method of claim 1, further comprising:
   determining the second target cell as a new target cell.

7. A user equipment (UE) configured to perform a handover in a wireless communication system, the UE comprising:
   a transceiver;
   at least one processor; and
   at least one computer memory operably connectable to the at least one processor and storing instructions that, when executed, cause the at least one processor to perform operations comprising:
   receiving, from a base station (BS), mobility assistance information informing the UE that conditional mobility is allowed, wherein the mobility assistance information includes information on candidate target cells for the conditional mobility;
   receiving a timer value including a first time period, where a handover to the first target cell may be not succeeded on the first target cell until the timer expires;
   measuring channel quality of the candidate target cells during the first time period;
   receiving, from the BS, a first threshold for a first target cell among the candidate target cells, a second threshold for a serving cell, a third threshold for the first target cell, and a fourth threshold for a second target cell among the candidate target cells;
   initiating a first random access procedure to a first target cell among the candidate target cells by transmitting a random access channel (RACH) preamble to the first target cell;
   initiating a handover to the first target cell as part of the first random access procedure, based on that a channel quality of the first target cell measured during the first time period is equal to or above the first threshold for the first target cell and a channel quality of the serving cell measured during the first time period is equal to or below the second threshold for the serving cell;
   during the first random access procedure after transmitting the RACH preamble to the first target cell:
      measuring channel quality of the candidate target cells during the first time period, based on the mobility assistance information;
      detecting that a channel quality of the second target cell measured during the first time period is greater than a channel quality of the first target cell measured during the first time period; and
      stopping the handover to the first target cell before detecting a failure of the handover to the first target cell, based on that the channel quality of the first target cell measured at the first time period is lower than the third threshold for the first target cell and the channel quality of the second target cell measured at the first time period is higher than the fourth threshold for the second target cell; and performing a second random access procedure to the second target cell by transmitting another RACH preamble to the second target cell based on contention free random access resources.

* * * * *